United States Patent [19]

Izumi et al.

[11] Patent Number: 5,265,037
[45] Date of Patent: Nov. 23, 1993

[54] ROTATIONAL SPEED DETECTING APPARATUS STORING ALTERNATE INFORMATION IN TWO MEMORIES

[75] Inventors: Shoji Izumi, Chiryu; Yasuhiro Tsuzuki, Anjo, both of Japan

[73] Assignee: Nippondenso Co., Ltd., Kariya, Japan

[21] Appl. No.: 943,138

[22] Filed: Sep. 10, 1992

Related U.S. Application Data

[63] Continuation of Ser. No. 621,718, Dec. 5, 1990, abandoned.

[30] Foreign Application Priority Data

Dec. 6, 1989 [JP] Japan .................. 1-316693

[51] Int. Cl.⁵ .............. G04F 10/00; G01P 3/44
[52] U.S. Cl. ................. 364/565; 364/569; 364/431.04; 324/166; 377/20
[58] Field of Search .......... 364/565, 569, 431.07, 364/431.03, 431.04, 431.05, 431.11, 431.12; 324/391, 392, 160, 166; 360/10.2; 377/20; 328/129.1, 130.1; 395/725

[56] References Cited

U.S. PATENT DOCUMENTS

| | | | |
|---|---|---|---|
| 4,485,452 | 11/1984 | Cording et al. | 364/565 |
| 4,523,289 | 6/1985 | Soma et al. | 364/569 |
| 4,527,248 | 7/1985 | Takase et al. | 364/565 |
| 4,569,027 | 2/1986 | Nakano et al. | 364/565 |
| 4,613,950 | 9/1986 | Knierim et al. | 364/569 |
| 4,613,951 | 9/1986 | Chu | 364/569 |
| 4,685,075 | 8/1987 | Morita et al. | 364/569 |
| 4,803,615 | 2/1989 | Johnson | 395/725 X |
| 4,805,096 | 2/1989 | Crohn | 395/725 |
| 4,870,664 | 9/1989 | Hayashi | 328/129.1 X |
| 4,885,710 | 12/1989 | Hersberget et al. | 364/565 |
| 4,985,831 | 1/1991 | Dulong et al. | 395/725 X |
| 4,992,730 | 2/1991 | Hagiya | 324/160 |

FOREIGN PATENT DOCUMENTS

| | | |
|---|---|---|
| 55-82965 | 6/1980 | Japan . |
| 62-93610 | 4/1987 | Japan . |
| 1-97871 | 4/1989 | Japan . |

*Primary Examiner*—Thomas G. Black
*Assistant Examiner*—Collin W. Park
*Attorney, Agent, or Firm*—Cushman, Darby & Cushman

[57] ABSTRACT

A sensor generates a pulse signal at a predetermined angle of a rotating body. First and second registers respectively memorize both of a leading edge and a trailing edge of a divided signal of the pulse signal. The first resistor maintains the timing of the detected preceding leading edge until the next leading edge is detected so that the timing of the next leading edge is renewed when the next leading edge is detected. The second register maintains and renews the timing of the trailing edge in the same manner as the first register. The rotational speed is obtained by computing the time difference of each memorized timing at the start of such computing operation. Accordingly, an accurate rotational speed can be always obtained, even when the rotational speed computing operation is delayed by a high priority interrupt operation.

27 Claims, 4 Drawing Sheets

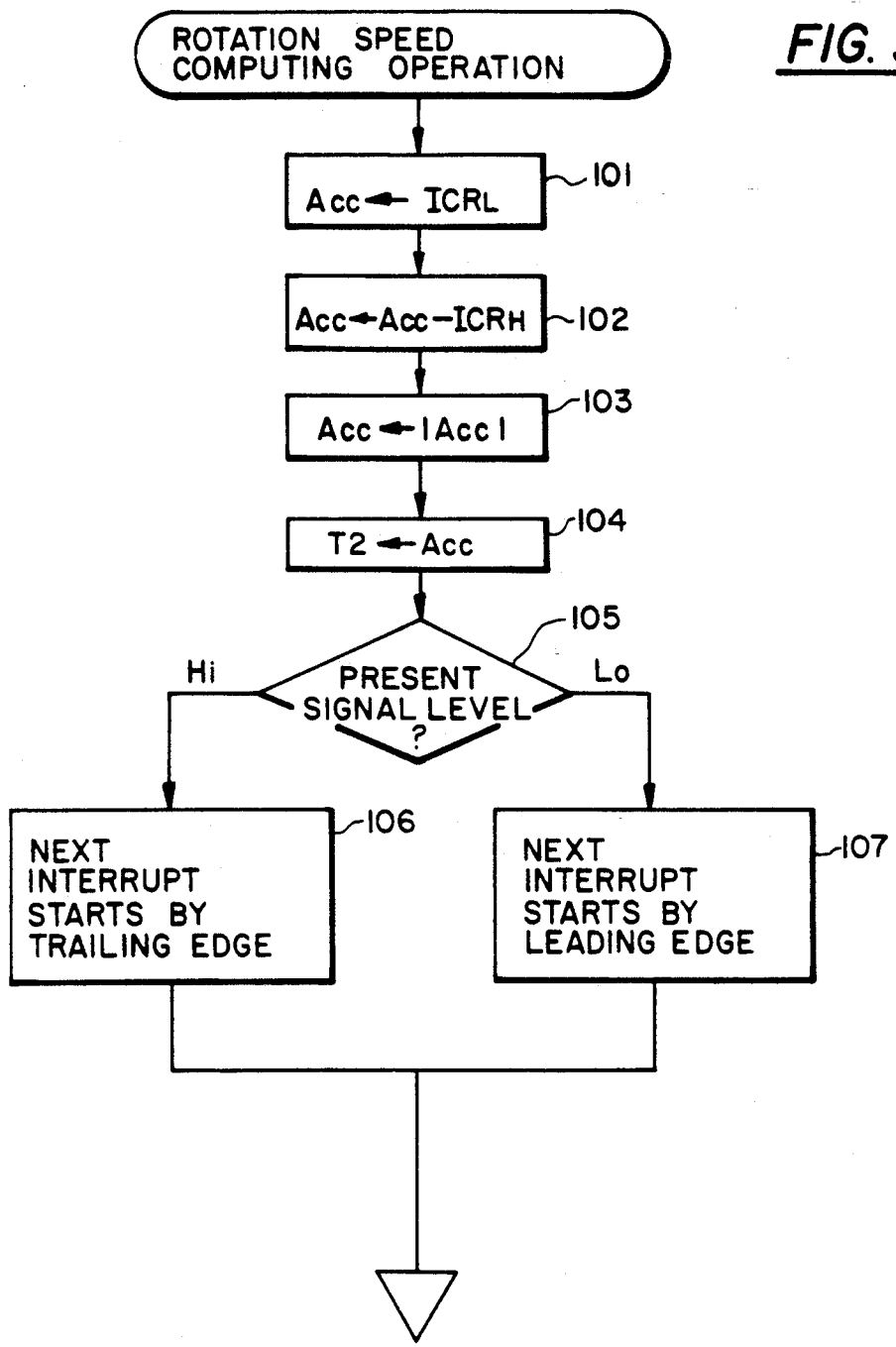
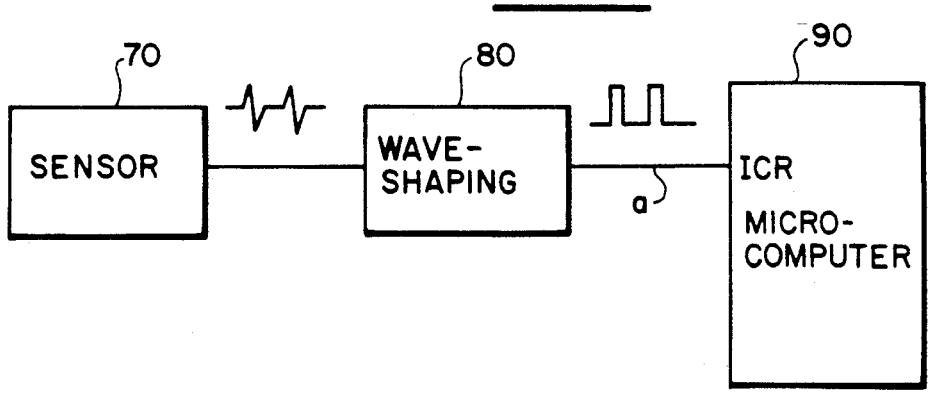

a b (HIGH PRIORITY INTERRUPT PROCESSING)

c (ROTATION SPEED COMPUTING PROCESSING)

ROTATIONAL SPEED DETECTING APPARATUS STORING ALTERNATE INFORMATION IN TWO MEMORIES

This is a continuation of application Ser. No. 07/621,718, filed Dec. 5, 1990, now abandoned.

BACKGROUND OF THE INVENTION

Field of the Invention

The present invention relates to a rotational speed detecting apparatus which detects, for instance, a rotation speed of an internal combustion engine or a rotation speed of the wheels thereof.

Description of the Art

A conventional rotational speed detecting apparatus is disclosed in Toku-Kai-Hei 1-97871 (Japanese Patent application publication No. 1-97871). According to the disclosed apparatus, a microcomputer measures an interval between the leading edges of vehicle speed pulse signal, or an interval between the trailing edges of such pulses, so as to compute the rotational speed of the wheels. In this case, the number of times for computing the rotation speed increases in response to an increase of the rotational speed. The computing load of the microcomputer also increases when it carries out another control in addition to the rotational speed computation. Accordingly, when the microcomputer carries out another control prior to the rotational speed computation, an improper rotational speed could be computed because of the interruption of the operation for computing the rotational speed.

With reference to FIG. 5 through FIG. 7, the problem of the prior art is explained in detail.

According to the configuration of the conventional apparatus, a signal from a vehicle speed sensor 70 is inputted into a wave-shaping circuit 80 so as to shape a pulse signal as shown in FIG. 5. This pulse signal is inputted into an input-capture-register of the microcomputer 90. When the pulse signal is inputted into the input-capture-register (hereinafter called ICR), the computer latches the value of a free-running timer within the microcomputer 90 in the ICR so as to memorize the timing when the pulse is generated. Then, the computer 90 carries out an interrupt program shown in FIG. 6 for computing the vehicle speed so as to measure the time interval of the pulse signals.

In step 201 of the program, data from the ICR is stored in an accumulator (hereinafter called Acc). In step 202, data in the Acc is further stored in a register. In step 203, a difference between an input timing of the preceding pulse signal (which was memorized in a memory T1) and the input timing of the present pulse signal (which was memorized in Acc in step 201) is computed. The value of such a difference is memorized in a memory T2 in step 204. In step 205, the stored data in step 202 is returned to the Acc. In step 206, the returned data is memorized in memory T1 in order to be used as an input timing of a precedent pulse signal in the following computing operation. In this way, when the preceding pulse signal was generated, the timing is memorized according to this computing operation. If an interrupt program is carried out prior to the above-described vehicle speed compute program by the microcomputer and such a prior interrupt program lasts during generation of two pulse signals, the memorized timing is not renewed. As a result, an improper vehicle speed is computed. As shown in FIG. 7, proper time intervals $T_{12}$ and $T_{23}$ are obtained regarding the pulse intervals $t_1$-$t_3$. However, if an interrupt operation occurs from the timing $t_4$ through the timing $t_5$, a time interval between the pulse $t_3$ and the pulse $t_5$ is improperly obtained at a timing $t_5$ because the memorized data is not renewed at the timing $t_4$.

SUMMARY OF THE INVENTION

In consideration of the above-described problem, an object of the present invention is to provide a rotational speed detecting apparatus which is capable of computing proper rotational speed even if an interrupt operation is carried out by a microcomputer prior to the rotational speed compute processing.

For the purpose of achieving the above object, a rotational speed detecting apparatus according to the present invention, which has a sensor for generating a pulse signal at a predetermined rotational angle of a rotating body and a computing device for measuring a time interval of each pulse signal from the sensor, comprises the following elements: namely first and second memory means for memorizing a generation timing of the pulse signal;

changing means, in response to said pulse signal, for changing said first and second memory means subsequently so that said first and second memory means memorize said generation timing of the pulse signal subsequently; and computing means for computing a time difference between said generation timing memorized in said first memory means and said generation timing memorized in said second memory means.

According to the present invention, other structure can be provided as follows:

A rotation speed detecting apparatus comprises the following elements: namely, a sensor for generating a pulse signal at a predetermined rotation angle of a rotation body;

computing device for measuring a time interval of each pulse signal from the sensor;

subharmonic means for inputting said pulse signal from said sensor and outputting a subharmonic signal indicative of a subharmonic if said pulse signal;

edge detecting means for detecting a leading edge and a trailing edge of said subharmonic signal;

memory means, in response to said edge detecting means, for memorizing a leading edge timing and a trailing edge timing separately; and computing means for computing a time interval between said leading edge timing and said trailing edge timing.

According to the first-described structure, the generation timing of each pulse signal, which is generated at a predetermined angle of the rotating body, is subsequently memorized in the first and second memory means. Then, the time difference of each generation timing is computed. Thereafter, the generation timing of two pulse signals is renewed regardless of the operation of the computing means. As a result, even if the computing means includes a microcomputer and is an interrupt program is carried out by the microcomputer prior to the rotation speed computing program, the generation timing of the preceding pulse signal is accurately renewed.

According to the second-described structure, the generation timing of the leading edge and the generation timing of the trailing edge are memorized separately. Because each of the leading edge and the trailing edge of the subharmonic corresponds to the respective pulse signals, the rotation speed is obtained by computing the time interval between the generation timing of the leading edge and the generation timing of the trailing edge. As a result, even if the computing means includes a microcomputer and if an interrupt program is carried out by the microcomputer prior to the rotational speed computing program, the generation timing of the preceding pulse signal is accurately renewed.

As described above, even when an interrupt program is carried out by the microcomputer prior to the rotational speed computing program, the generation timing the preceding pulse signal is accurately renewed. Therefore, a proper rotational speed can be obtained according to the present invention.

BRIEF DESCRIPTION OF THE DRAWINGS

FIG. 3 is a flow chart showing an operation of the embodiment;

FIG. 5 is a schematic view of a conventional apparatus;

DETAILED DESCRIPTION OF THE EMBODIMENT

An embodiment of the present invention, which is applied to a control apparatus of an internal combustion engine, is explained below.

Figure 1:
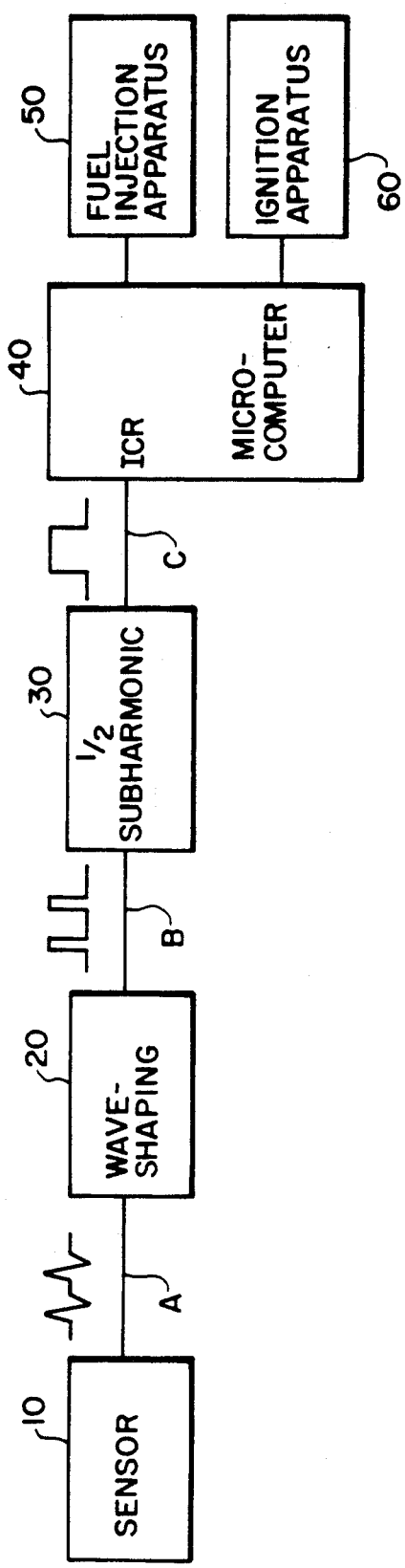
FIG. 1 is a block diagram showing an embodiment of the present invention.
Figure 4:
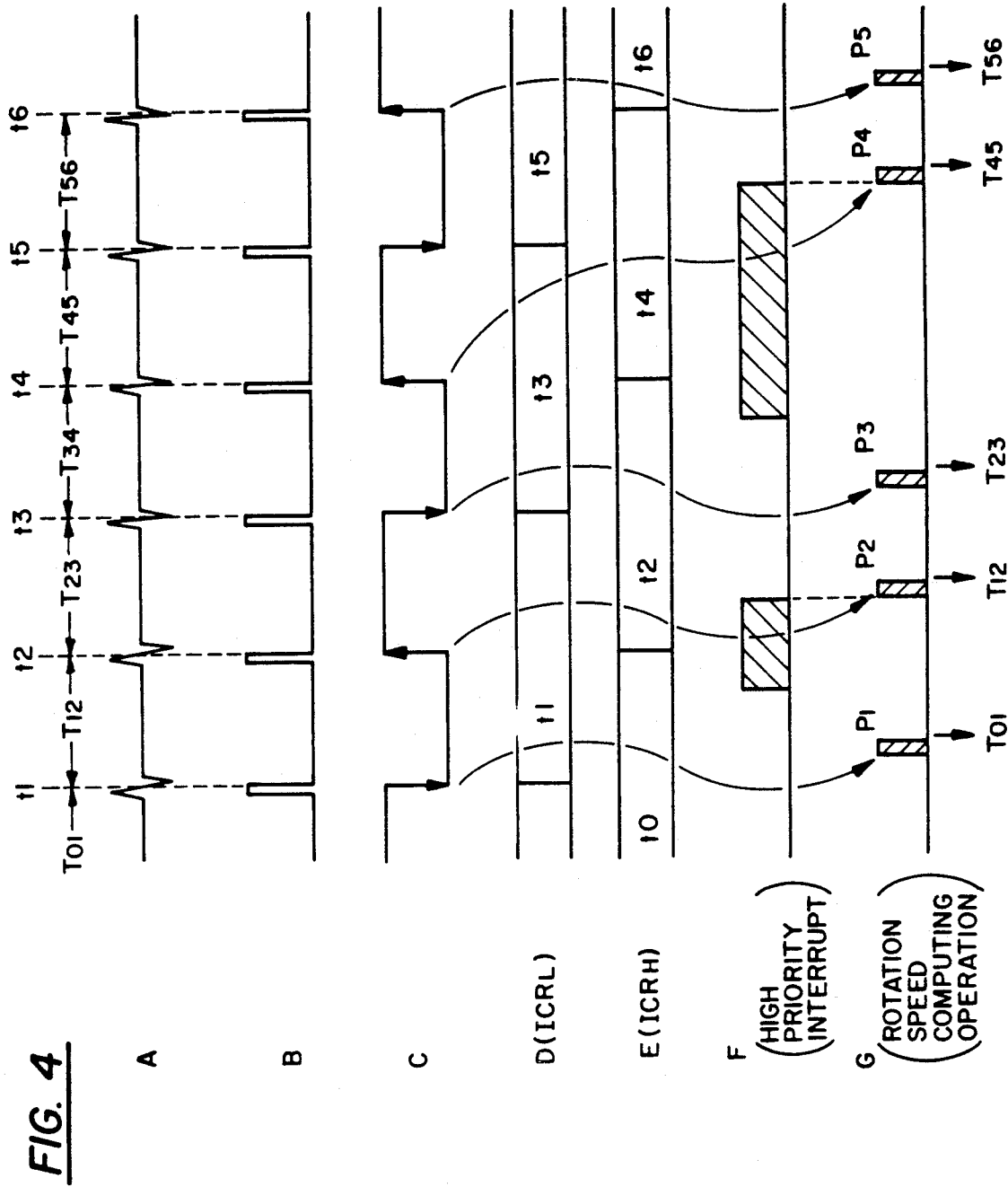
FIG. 4 A through G is a time chart showing and operation of the embodiment.
Figure 7:
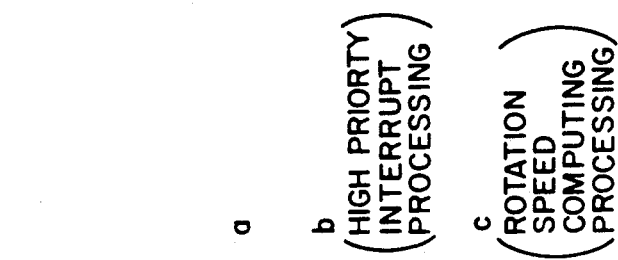
FIG. 7 is a time chart of the conventional apparatus.
Figure 6:
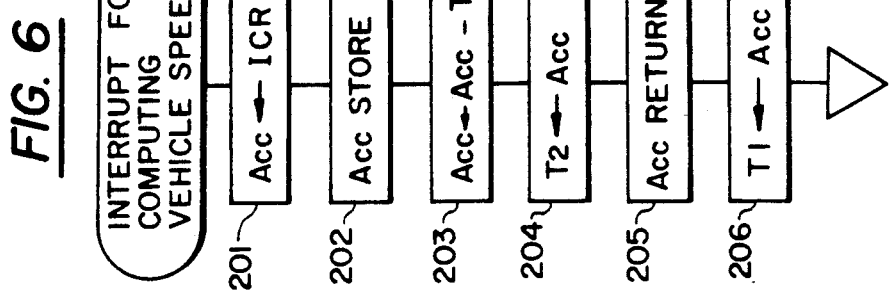
FIG. 6 is a flow chart of the conventional apparatus.

FIG. 1 is a block diagram showing an internal combustion engine apparatus which carries out a fuel injection control and an ignition control. In this embodiment, the rotational speed of a wheel is calculated by measuring the interval between each signal which is generated from a magnetic pick-up (MPU) at a predetermined rotational angle of the wheel. The detected signal A from the magnetic pick-up 10 is inputted into a wave-shaping circuit 20 in which the signal is changed into a pulse signal B. The pulse signal B is inputted into a ½ subharmonic circuit 30 in which the pulse signal B is changed to a subharmonic signal C which alternately changes state from high to low or low to high as shown in FIG. 4, in accordance with the trailing edge of the pulse signal B. The subharmonic signal outputted from the ½ subharmonic circuit 30 is inputted into an input capture terminal (ICR) of a microcomputer 40.

Figure 2:
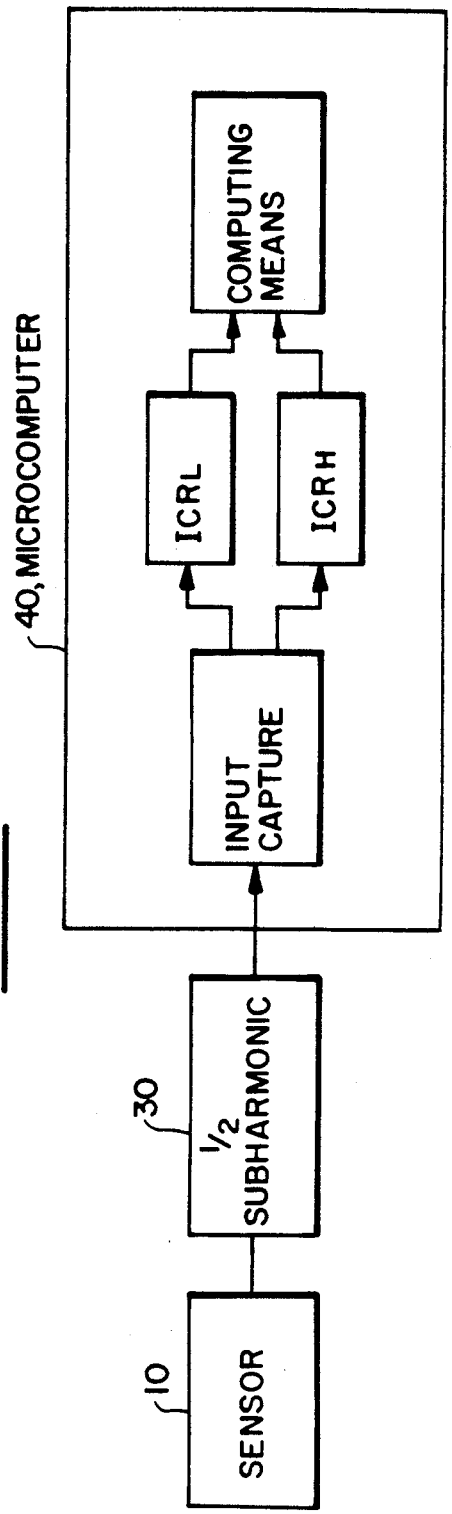
FIG. 2 is a block diagram of the embodiment shown in FIG. 1.

FIG. 2 is a block diagram schematically showing the function of the embodiment. The microcomputer 40 latches each of the leading edge timing and the trailing edge of the subharmonic signal c into input capture registers H ($ICR_h$ and $ICR_L$), respectively by using its input capture function. The microcomputer 40 renews the data in the register $ICR_H$ at each leading edge of the subharmonic C and renews the data in the register $ICR_L$ at each trailing edge of the subharmonic C. In this embodiment, the microcomputer 40 has two separate input registers for the leading edge and the trailing edge, respectively. However, if a microcomputer has only one input capture resistor, a two system input capture can be applied (e.g., a microcomputer MBL 6801 manufactured by FUJITSU CO., LTD.).

The microcomputer 40 carries out the rotational speed computing operation illustrated in FIG. 3. For controlling the fuel injection apparatus 50 and the ignition apparatus 60, the microcomputer 40 also carries out the fuel injection control and ignition control in response to the signals from sensors such as an engine rotation speed sensor, intake air pressure sensor and knocking detection sensor.

The rotational speed computing operation is explained below. FIG. 3 shows a flow chart carried out by the microcomputer 40. FIG. 4 is a time chart showing a interrupt operation for computing the rotational speed of the wheel. In step 101 of FIG. 3, the timing of the latest leading edge of the subharmonic signal C, which is memorized by the input capture function of the microcomputer 40, is transferred from the register ($ICR_L$) to an accumulator, (Acc) In step 102, a difference between the register in which the timing of the latest leading edge of the subharmonic signal C is memorized and the accumulator is computed. In step 103, an absolute value of the above described difference is obtained. Then, the obtained absolute value, which is a rotational time indicative of the wheel rotational speed, is stored in a memory ($T_2$) in a step 104. In step 105, for the purpose of deciding whether the next interrupt is started by the leading edge of the subharmonic C or by the trailing edge, the control proceeds to the next step in response to the level of the subharmonic signal C (high level (Hi) or low level (Lo)).

When it is judged that the level of the subharmonic signal C is the high level in the step 105, the next interrupt is set so that it starts by the trailing edge in step 106. On the other hand, when it is judged that the level of the subharmonic signal C is at the low level in step 105, the next interrupt is set so that it starts by the leading edge in step 107. As explained above, the microcomputer 40 computes the rotational time indicative of the wheel rotational speed.

The operation for computing the wheel rotation speed is explained below with reference to FIG. 4. In FIG. 4, the reference numerals A, B and C indicate sensor signal, pulse signal and the ½ subharmonic signal, respectively. The reference numerals D and E indicate the content of the register $ICR_L$ and the content of the register $ICR_H$, respectively. The reference numerals F and G indicate a computing operation by a high priority interrupt and the rotational speed computing operation (illustrated in FIG. 2), respectively. In this embodiment, the high priority interrupt occurs for the fuel injection control or the ignition timing control which uses engine rotational speed or crank angle. The data in the resistor $ICR_L$ is renewed at every falling edge of the subharmonic C. The interrupt operation $P_1$ is carried out at the trailing edge $t_1$ of the subharmonic signal C so as to compute the rotational time $T_{01}$. The interrupt operation $P_2$ is carried out at the leading edge $t_2$ of the subharmonic signal C so as to compute the rotation time $T_{12}$. In a similar way, the rotational time $T_{23}$ is computed at the trailing edge $t_3$. The leading edge $t_4$ occurs during the high priority interrupt operation. So, the interrupt operation $P_4$ for the rotational speed computing operation is carried out after the high priority interrupt operation is over. In this case, although the interrupt operation $P_4$ is carried out after the occurrence of the trailing edge $t_5$, the rotation time $T_{45}$ is computed in the interrupt operation $P_4$ because the data of the resistor $ICR_L$ has been renewed by the input capture function. In the interrupt operation P₄ the next interrupt operation is determined so that it occurs by the leading edge as shown in the steps 105 and 107. Accordingly, since the leading edge t₅ is ignored, the interrupt operation is not carried out at the leading edge. Then, the interrupt operation is carried out at the leading edge t₆ so as to compute the rotational time T₅₆.

According to the time chart shown in FIG. 4, the trailing edge for the next interrupt operation has been selected at the trailing edge t₁. However, the interrupt operation can be started by either edge when the apparatus is first powered or when the first edge occurs. Otherwise, only the first interrupt operation can be carried out by both edges.

According to the above described embodiment, the occurring timing of the pulse signal from the rotation sensor is alternately stored in each of two registers in the microcomputer by using the hardware operation so as to obtain the difference of each occurrence timing. Accordingly, the time difference between one pulse signal and the next one can be accurately obtained even when the operation load of the microcomputer increases. As a result, the accurate rotational speed can be computed.

According to the present invention, the data of two registers are renewed by using both the leading edge and the trailing edge of the subharmonic signal which is made from the pulse signal from the rotation sensor. Namely, because one register is used for storing only the leading edge and the other resistor is used for storing only the trailing edge, the configuration of the apparatus is simplified.

In additional to the above features, the data of each register is alternately renewed by only the input capture function of the computer because the interrupt operation is carried out by using both the leading edge and the trailing edge.

Although the above described embodiment exemplifies the present invention which is applied for computing the wheel speed in the engine control system, it is possible to apply the present invention to other embodiment such as a calculation of the engine speed, an antibrake system or a cruise control system.

We claim:

1. A time interval detecting apparatus which detects a time interval between pulses from a sensor for generating a pulse signal at a predetermined angle of a rotating body, said apparatus comprising:
   first dedicated memory means dedicated for memorizing a generation time of a falling edge of said pulse signal;
   second dedicated memory means dedicated for memorizing a generation time of a rising edge of said pulse signal;
   controlling means, responsive to a level of said pulse signal, for alternately connecting said pulse signal to said first and second memory means so that said first memory means always memorizes said generation times of said rising edges and said second memory means always memorizes said generation times of said falling edges; and
   computing means for computing a time difference between a last generation time memorizes in said first memory means and a last generation time memorized in said second memory means, said computing means being interrupted from said computing the time difference by a high priority interrupt, said first and second memory means memorizing said generation times at all times, including during said high priority interrupt.

2. Apparatus as in claim 1 further comprising means, receiving said pulse signal from said sensor, for dividing said pulse signal into a divided signal which changes state each time one pulse of said pulse signal occurs, and coupling said divided signal to said controlling means to control which of said first and second memory means will memorize said generation time.

3. Apparatus as in claim 2 wherein said computing means includes means for determining a level of said divided signal to be a high level or a low level, and means for computing the time difference based on said level.

4. Apparatus as in claim 3 wherein a beginning of computation is set as a next falling edge when the divided signal is at a high level and said beginning is set as a next rising edge when said divided signal is at a low level.

5. An apparatus as in claim 3 wherein said computing is started at a falling edge when the divided signal is at a high level and said computing is started at a rising edge when said divided signal is at a low level.

6. Apparatus as in claim 1 wherein said computing means includes means for determining an absolute value of a difference between said last generation timing in said first memory means and said last generation timing in said second memory means.

7. An apparatus as in claim 1 wherein said high priority interrupt is an interrupt for one of fuel injection control or ignition timing control.

8. An apparatus as in claim 1, wherein said controlling means is responsive to said level of said pulse signal such that when said level is low, said signal is coupled to said second memory means to detect the next generation time of a rising edge and when said level is high, said signal is coupled to said first memory means to memorize the next generation time of the next falling edge.

9. An apparatus as in claim 1, wherein said computing means includes means for computing said time difference after said high priority interrupt by taking a difference between a time in said first memory means and a time in said second memory means.

10. A time interval detecting apparatus which detects a time interval between pulses from a sensor for generating a pulse signal at a predetermined rotation angle of a rotating body, said apparatus comprising:
    signal producing means for inputting said pulse signal from said sensor and producing a divided signal which changes state at each said pulse signal to have alternate rising and falling edges occurring synchronized with alternate pulses of said pulse signal;
    edge detecting means for detecting a rising edge and a falling edge of said divided signal;
    a first memory, responsive to said edge detecting means, dedicated for memorizing a rising edge time at each occurrence of a rising edge;
    a second memory, dedicated for memorizing a falling edge time at each occurrence of a falling edge, whereby said first memory always stores latest rising edge times and said second memory always stores latest falling edge times; and
    computing means for computing a time interval between a last rising edge time in said first memory and a last falling edge time in said second memory.

11. An apparatus as in claim 10 further comprising controlling means which controls said first and second memory such that said first memory memorizes generation times of falling edges of said divided signal and said second memory means memorizes generation times of rising edges of said divided signal.

12. An apparatus as in claim 10 wherein said memory means includes a first register for memorizing said leading edge timings and a second register for memorizing said trailing edge timings.

13. An apparatus as in claim 12 wherein said computing means includes means for determining a level of said divided signal to be one of a high level and a low level, and means for setting said first register to memorize the next time if low level is detected and setting said second register to detect said next time if high level is detected.

14. An apparatus as in claim 12 wherein said computing means includes means for determining an absolute value of a difference between a last generation timing in said first register and a last generation timing in said second register.

15. An apparatus as in claim 10 wherein said computing means is interrupted from said computing the time difference by a high priority interrupt, said memory means memorizing said generation timings at all times, including during said high priority interrupt, and wherein said high priority interrupt is an interrupt for one of fuel injection control and ignition timing control.

16. An apparatus as in claim 10, wherein said comprising means includes means for computing said time difference after said high priority interrupt by taking a difference between a time in said first memory means and a time in said second memory means.

17. An apparatus for detecting a rotational speed of a rotating body comprising:
sensor means for generating a pulse signal each time said rotating body rotates by a predetermined amount;
first and second memory means for alternately memorizing first and second times respectively of generations of said pulse signal such that two latest times of generations are always stored with one in said first memory means and the other in said second memory means;
computing means for periodically computing a rotational speed of said rotating body using most recently stored areas of said first and second times memorized by said first and second memory means, said computing means having an interrupt control function by which the rotational speed computation is interrupted by a high priority interrupt computation and including means for computing said rotational speed after said high priority interrupt by accessing said first and second memory means; and
means for inputting said first and second times into said first and second memory means independently of whether of said computing means is interrupted by said high priority interrupt.

18. An apparatus as in claim 17 further comprising means for dividing said pulse signal into a divided signal which changes state at each pulse of said pulse signal, and wherein said first memory means is a first register for memorizing times of rising edges of said divided signal times of falling edges.

19. An apparatus as in claim 18 wherein said computing means includes means for determining a level of said divided signal to be a high level or a low level, and means for setting a beginning of said computing the time difference based on said level.

20. An apparatus as in claim 19 wherein said beginning is set as a falling edge when the divided signal is at a high level and said beginning is set as a rising edge when said divided signal is at a low level.

21. An apparatus as in claim 18 wherein said computing means includes means for determining an absolute value of a difference between said timing in said first register and said timing in said second register.

22. An apparatus as in claim 17 wherein said high priority interrupt is an interrupt for one of fuel injection control or ignition timing control.

23. A time interval detecting apparatus used with a sensor for generating a pulse signal at a predetermined rotation angle of a rotating body, said apparatus comprising:
signal producing means for processing said pulse signal from said sensor and producing a square wave-type signal which changes output levels thereof at each said pulse signal to have alternate rising and falling edges at alternate pulses;
edge detecting means for detecting a rising edge and a falling edge of said square wave-type signal;
a first dedicated memory means, responsive to said edge detecting means, dedicated for memorizing a rising edge time at each occurrence of said rising edge; a second dedicated memory means, dedicated for memorizing a falling edge time at each occurrence of said falling edge;
determining means for determining said output level of said square wave-type signal; and
computing means for computing a time interval between a latest one of said memorized rising edge times and the latest one of said memorized falling edge times at a predetermined computation time, said computation time being a time of one of said rising edge or said falling edge, dependent on said output level of said square wave-type signal determined by said determining means.

24. A method of detecting a time difference that has elapsed between adjacent positions of a rotating member, having a sensor for generating a pulse signal at a predetermined angle, comprising the steps of:
producing a divided signal from said pulse signal which has an output level which changes states at each occurrence of said pulse signal to have alternate rising edges and falling edges at successive pulse signals;
latching a time of a rising edge and a time of a falling edge of said signal into first and second registers respectively, so that said first register always stores rising edge times and said second register always stores falling edge times; and
computing a difference between said leading edge time and said falling edge time which are last memorized in said registers, said difference being indicative of said rotational speed.

25. The method as defined in claim 24 wherein the step of computing includes:
determining a time at which to compute said difference as one of said rising edge timing or said falling edge timing according to said output level of said divided signal.

26. The method as defined in claim 24 wherein the step of computing further includes:
starting an interrupt of the rotational speed computation which can be interrupted by a high priority interrupt computation.

27. A method as in claim 26, wherein said high priority interrupt computation is for control from the group consisting of a fuel injection control and an ignition timing control of an internal combustion engine.

* * * * *